(12) United States Patent
Fukae et al.

(10) Patent No.: US 6,871,241 B2
(45) Date of Patent: Mar. 22, 2005

(54) INTERFACE APPARATUS, COMMUNICATION DEVICE INCLUDING SAME, AND COMMUNICATION METHOD USING SAME

(75) Inventors: Fumihiro Fukae, Sakurai (JP); Hitoshi Naoe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 55 days.

(21) Appl. No.: 10/147,970

(22) Filed: May 20, 2002

(65) Prior Publication Data

US 2002/0177913 A1 Nov. 28, 2002

(30) Foreign Application Priority Data

May 25, 2001 (JP) ........................................ 2001-157715

(51) Int. Cl.[7] .............................................. G06F 3/00
(52) U.S. Cl. ............................ 710/15; 710/5; 710/12; 710/36
(58) Field of Search ........................... 710/5, 6, 8, 12, 710/15, 36, 62

(56) References Cited

U.S. PATENT DOCUMENTS

| | | | | | |
|---|---|---|---|---|---|
| 4,829,575 | A | * | 5/1989 | Lloyd | 704/238 |
| 4,965,472 | A | * | 10/1990 | Anderson | 326/46 |
| 5,586,117 | A | * | 12/1996 | Edem et al. | 370/466 |
| 5,623,417 | A | * | 4/1997 | Iwasaki et al. | 716/18 |
| 5,774,738 | A | * | 6/1998 | Hillan | 712/1 |
| 5,845,324 | A | * | 12/1998 | White et al. | 711/128 |
| 5,859,985 | A | | 1/1999 | Gormley et al. | |

FOREIGN PATENT DOCUMENTS

JP 09-134265 A 5/1997

OTHER PUBLICATIONS

Bhasker, J., Verilog HDL Synthesis, A Practical Primer; 1998; Star Galaxy Publishing.*
www.howstuffworks.com, keyword "firewire".*
www.howstuffworks.com, keyword "fiber optics"I.*

* cited by examiner

Primary Examiner—Kim Huynh
Assistant Examiner—Alan Chen
(74) Attorney, Agent, or Firm—Birch, Stewart, Kolasch & Birch, LLP.

(57) ABSTRACT

An interface apparatus of the present invention includes an external state machine for controlling transmission of data and a control code from an own device to a counterpart device in accordance with an inputted control code, and an internal state machine for judging whether the own device is in a data transmission preparatory state or in a data transmission state, and notifies a result of the judgement to the external state machine. The external state machine invalidates the inputted control code during a period in which the internal state machine notifies that the own device is in the data transmission preparatory state.

15 Claims, 9 Drawing Sheets

| TRANSMISSION ARBITRATION SIGNAL | | LINE STATE NAME | NOTE |
|---|---|---|---|
| ARB_A_Tx | ARB_B_Tx | | |
| Z | Z | IDLE | sent for indicating a gap |
| Z | 0 | TX_REQUEST | sent to a parent node for requesting a bus |
| Z | 1 | TX_GRANT | sent to a child node when a bus is granted |
| 0 | 0 | TX_PARENT_NOTIFY | sent to a parent-candidate node in a tree ID phase |
| 0 | 1 | TX_DISABLE_NOTIFY | sent for disabling a connecting port |
| 1 | Z | TX_SUSPEND | sent for suspending a connecting port |
| 1 | 0 | TX_DATA_PREFIX | sent before packet data or before packet data of a connected subaction |
| 1 | 1 | TX_CHILD_NOTIFY | sent to a child node for acknowledging PARENT_NOTIFY |
|  |  | TX_IDENT_DONE | sent to a parent node for indicating that a self ID phase ended |
|  |  | TX_DATA_END | sent when packet transmission ends |
|  |  | BUS_RESET | sent for reconstructing a bus |

FIG. 9

| RECEIPT ARBITRATION SIGNAL | | LINE STATE NAME | NOTE |
|---|---|---|---|
| ARB_A_Rx | ARB_B_Rx | | |
| Z | Z | IDLE | A PHY of a connected adjacent node is not operative. |
| Z | 0 | RX_PARENT_NOTIFY | A PHY of a connected adjacent node is going to be a child. |
| Z | 1 | RX_REQUEST_CANCEL | A PHY of a connected adjacent node canceled a request. |
| 0 | Z | RX_IDENT_DONE | A PHY of a child node ended a self ID phase. |
| | | RX_SELF_ID_GRANT | A PHY of a parent node has granted a bus for a self ID. |
| | | RX_REQUEST | A PHY of a child node is requesting a bus. |
| 0 | 0 | RX_ROOT_CONTENTION | Both PHYs of this node and its connected adjacent node are going to be child nodes. |
| | | RX_GRANT | A PHY of a parent node has granted control of a bus. |
| | | RX_SUSPEND | A connected adjacent node is going to suspend this node. |
| 0 | 1 | RX_PARENT_HANDSHAKE | A PHY of a connected adjacent node acknowledges PARENT_NOTIFY. |
| | | RX_DATA_END | A PHY of a connected adjacent node ends transmission of a data block and opens a bus. |
| 1 | Z | RX_CHILD_HANDSHAKE | A PHY of a connected adjacent node acknowledges TX_CHILD_NOTIFY. |
| 1 | 0 | RX_DISABLE_NOTIFY | A PHY of a connected adjacent node is going to disable this node. |
| 1 | 1 | RX_DATA_PREFIX | A PHY of a connected adjacent node is going to send packet data or going to send further more data after ending transmission of a data block. |
| | | BUS_RESET | sent for reconstructing a bus. |

INTERFACE APPARATUS, COMMUNICATION DEVICE INCLUDING SAME, AND COMMUNICATION METHOD USING SAME

FIELD OF THE INVENTION

The present invention relates to an interface apparatus used for a serial bus for connecting between a personal computer and its peripheral device, and between Audio/Visual devices, and to a communication device including the same and a communication method using the same.

BACKGROUND OF THE INVENTION

As a communication standard of a serial bus for connecting between a personal computer and its peripheral device, and between Audio/Visual devices, there is the IEEE 1394 high performance serial bus standard (hereinafter, referred to as the IEEE 1394 standard).

In the IEEE 1394 standard, data transmission is specified at 100 Mbps (98.304 Mbps), 200 Mbps (196.608 Mbps), and 400 Mbps (393.216 Mbps), and a 1394 port having an upper transfer rate is specified to maintain compatibility with a lower transfer rate. Numeric values in the parentheses show actual transfer rates.

This allows a network to have the data transfer rates of 100 Mbps, 200 Mbps, and 400 Mbps.

Figure 7:
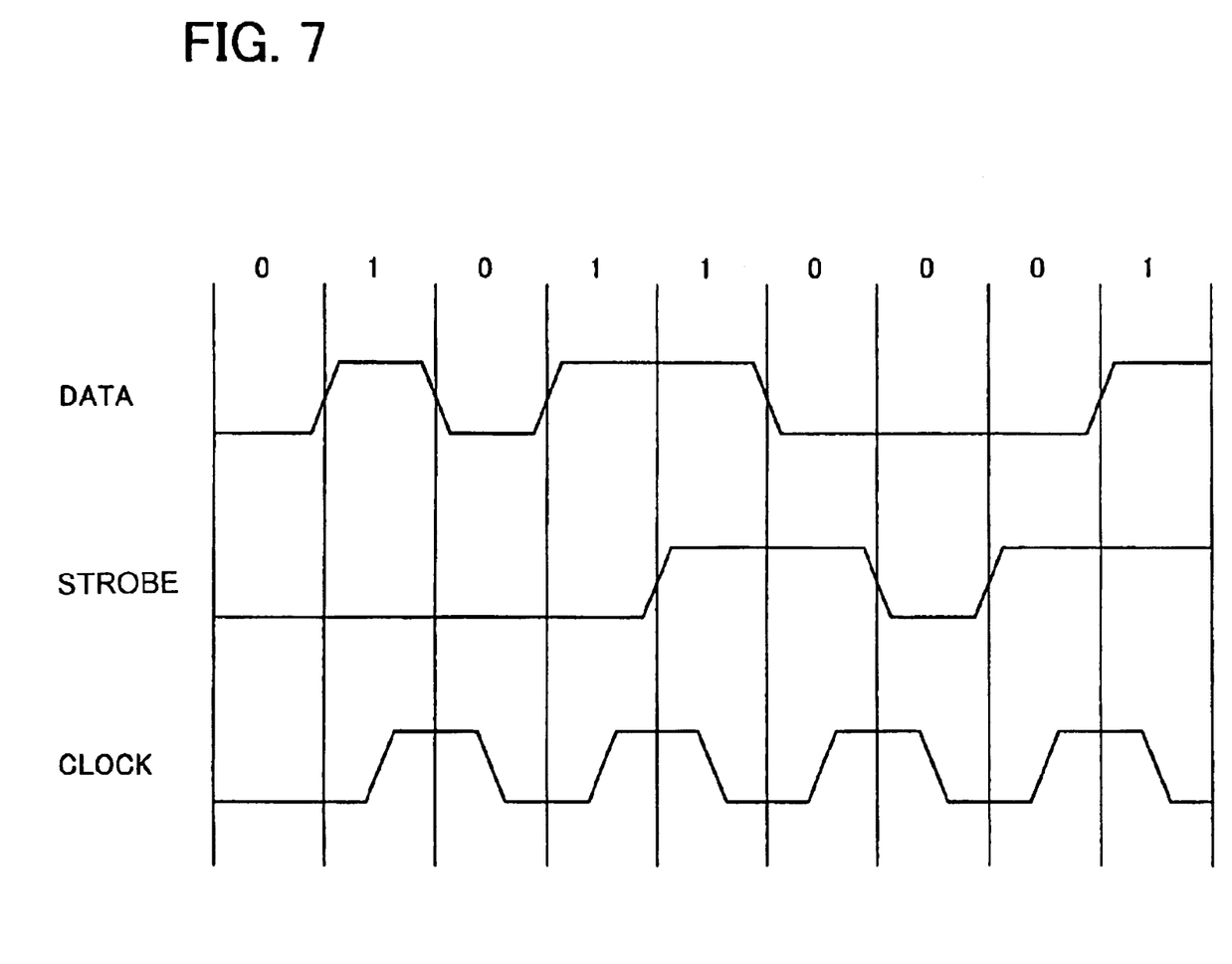
FIG. 7 is an explanatory diagram of a DS-LINK coding method.

Further, in the IEEE 1394 standard, as shown in FIG. 7, transmission data are converted into two signals, which are a DATA and a STROBE, which is supplementary to the DATA. The IEEE 1394 standard employs a transmission format of a DS-Link (Data/Strobe Link) coding method, which can generate a CLOCK from obtaining an exclusive OR of the two signals.

An arbitration signal at the physical layer is expressed with two sets of twisted-pair lines, namely TPA/TPA* and TPB/TPB*.

TPA/TPA*, which is one of the sets of the twisted-pair lines sends a strobe signal (Strb_TX) and receives a data signal (Data_RX). On the other hand, another set of the twisted-pair lines, that is TPB/TPB*, sends a data signal (Data_TX) and receives a strobe signal (Strb_RX).

A Strb_Tx signal, a Data_Tx signal, a Strb_Enable signal and a Data_Enable signal are used for generating arbitration signals (Arb_A_Rx, Arb_B_Rx) from a control code.

Figure 8:
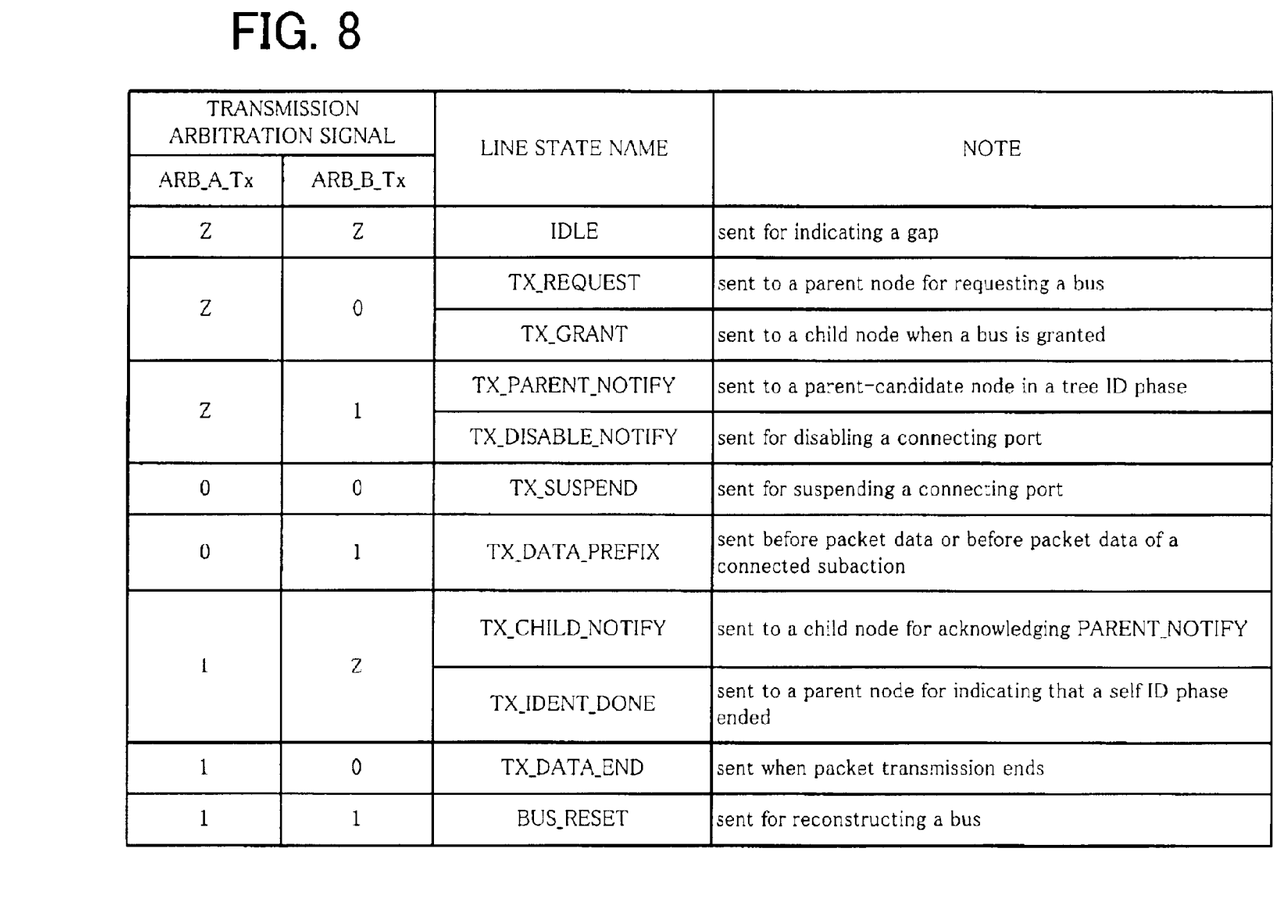
FIG. 8 is a diagram showing line states and meanings thereof of arbitration signals sent at the physical layer in the IEEE 1394 standard.
Figure 9:
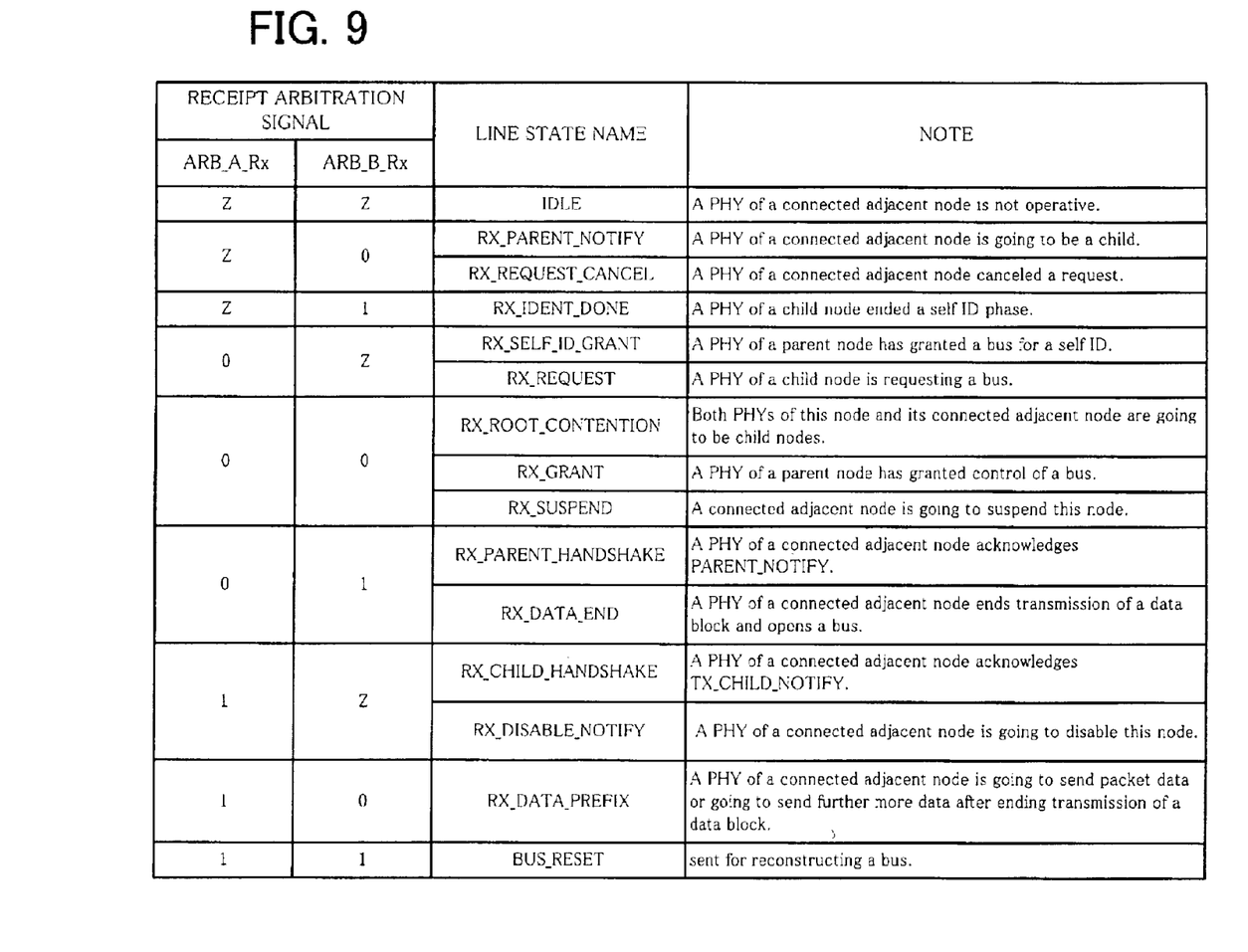
FIG. 9 is a diagram showing line states and meanings thereof of arbitration signals received at the physical layer in the IEEE 1394 standard.

Here, values and meanings of transmission arbitration signals are shown in FIG. 8, whereas values and meanings of receipt arbitration signals are shown in FIG. 9.

Furthermore, in the IEEE 1394 standard, two kinds of connecting methods can be used, which are a daisy-chain and a node branching. In the daisy-chain method, a device including the 1394 port can be connected up to 16 nodes, and a distance between the nodes can be up to 4.5 m. Further, when the daisy-chain method is used together with the node branching, a network can be structured, which can have up to 63 nodes (physical node addresses) for connection, the maximum in the standard.

Furthermore, in the IEEE 1394 standard, a cable can be plugged in or out while the device is operative, that is, while the power source is ON. When a node is added or deleted, a network is automatically reconstructed. At this time, a device connected to the node can be automatically recognized, and an ID or a location of the connected device is managed by an interface apparatus.

In data transmission between devices respectively including the interface apparatus that can respond to multiple transfer rates, speed negotiation, for example, is usually carried out as preparation of data transmission in a data transmission preparatory period. (Hereinafter, the devices are denoted as an own device and a counterpart device. The own device sends data to the counterpart device, and receives data from the counterpart device. The own device is provided with the interface apparatus discussed in the explanation, whereas the counterpart device is provided with the interface apparatus that corresponds to the discussed interface apparatus.)

As an example of the speed negotiation, there is a DAVIC (Digital Audio Visual Control) method. The speed negotiation method used in this method has a period for synchronizing bits and characters, a period for negotiating a communication speed, a period for confirming a termination of the speed negotiation, and a period for waiting for a constant time to retry the speed negotiation.

In the period for synchronizing bits and characters, first, a code having a large number of edges is sent in such a manner that the counterpart device that receives the code can easily synchronize bits, and then a PLL (Phase Locked Loop) in a receiving circuit synchronizes bits. After a predetermined period sufficient for a bit synchronization circuit to synchronize bits, a character synchronization circuit synchronizes characters. After synchronizing the characters, the period for negotiating the communication speed follows.

In the period for negotiating the communication speed, each of both devices between which the speed negotiation is performed respectively sends a code for indicating transmittable speeds of its own, and respectively receives a code for indicating a transmittable speed of the counterpart and thereby decides whether increase or maintain the transfer rate of its own at the present rate. After negotiation of the transfer rate is normally completed, the period for confirming the termination of the speed negotiation follows.

On the other hand, when the negotiation of the transfer rate is not completed within the predetermined constant time, the period for waiting for the predetermined constant time to retry the speed negotiation follows.

In the period for confirming the termination of the speed negotiation, the own device sends a code for indicating the termination of the speed negotiation and waits for receiving, from the counterpart device, a code for indicating the termination of the speed negotiation. When the own device receives the control code for indicating the termination of the speed negotiation, the speed negotiation is terminated, and then a period for data transmission follows.

During the period for waiting for the constant time to retry the speed negotiation, a serial signal is not sent. At this point, because the receiving circuit of the counterpart device no longer receives a receipt signal, the receiving circuit detects that abnormality has occurred in the speed negotiation, and then the period for synchronizing bits follows.

The own device in a state for waiting for the constant time to retry the speed negotiation, after the predetermined constant time, moves to the period for synchronizing bits and resumes the speed negotiation.

As described above, by carrying out the speed negotiation, the own device and the counterpart device that respectively include the interface apparatus that can respond to multiple transfer rates can obtain a best possible transfer rate at which the both devices can transmit data in a channel having a low error rate.

Moreover, the speed negotiation can be suspended and then resumed, even when the own device cannot normally receive the control code for indicating the transfer rate or the control code for indicating the termination of the speed negotiation, which is sent from the counterpart device, because a receiver of one device has abnormality or a channel has a high error rate.

By the way, a length of a metal cable in conformity to the IEEE 1394 is limited up to 4.5 m by reasons, such as transmission loss of a cable. At present, for long-distance transmission of a signal, an optical fiber, which has little transmission loss, is considered to be used in serial transmission, instead of the metal cable.

When a signal of the IEEE 1394 standard is transmitted by using the optical fiber, the speed negotiation, for example, is carried out, as preparation of the data transmission in the data transmission preparatory period, thereby determining a best possible transfer rate at which the both devices can transmit data.

In the data transmission preparatory period, a receipt arbitration signal from an optical port to a state machine in conformity to the IEEE 1394 is no use, and electric power consumed for generating the arbitration signal during the period is wasted.

Furthermore, during transition from the data transmission preparatory period to the data transmission period, the state machine in conformity to the IEEE 1394 may recognize an arbitration signal, which is being outputted into the state machine, as a valid arbitration signal depending on timing. In such a case, a node which is not to be suspended may be unexpectedly suspended, causing a node state (a bus state) that is against user's intention, when the arbitration signal is an arbitration signal such as a SUSPEND or a DISABLE in conformity to IEEE 1394a-2000.

SUMMARY OF THE INVENTION

The object of the present invention is to provide an interface apparatus, which is provided to a communication device, which can prevent the device from faultily operating when the own device is in a data transmission preparatory state, and which can reduce electric power consumption of the whole apparatus, and a communication device including the same and a communication method using the same.

In order to achieve the object, an interface apparatus of the present invention for sending and receiving a control code includes an external state machine for controlling transmission of the data and the control code from an own device to a counterpart device in accordance with an inputted control code, and an internal state machine for judging whether the own device is in a data transmission preparatory state or in a data transmission state and notifies a result of the judgment to the external state machine, wherein the external state machine invalidates the inputted control code during a period in which the internal state machine notifies that the own device is in the data transmission preparatory state.

According to the arrangement, while the own device is in the data transmission preparatory state, a control code inputted to the external state machine from the counterpart device is invalidated so that the external state machine will not control transmission of the data and the control code from the own device to the counterpart device.

Because of this, in the data transmission state, the own device sends the data and the control code in accordance with the inputted control code (generally the control code received from the counterpart device), whereas the own device does not send the data and the control code no matter whether the own device has the data and the control code from the counterpart device in the data transmission preparatory state. This allows the data and the control code to normally communicate between the own device and the counterpart device.

Therefore, it is possible to prevent the faulty operation of the counterpart device when the own device sends the control code to the counterpart device during a period in which the own device is in the data transmission preparatory state (the data transmission preparatory period).

Furthermore, during the data transmission preparatory period, it is not necessary to generate the control code to be sent to the counterpart device. This reduces the electric power consumed for generating the control code. As a result, this can realize the interface apparatus that consumes a small amount of electric power.

For a fuller understanding of the nature and advantages of the invention, reference should be made to the ensuing detailed description taken in conjunction with the accompanying drawings.

DESCRIPTION OF THE EMBODIMENTS

First Embodiment

An embodiment of the present invention is explained as follows. Note that, in the present embodiment, an interface apparatus used in the IEEE 1394-1995 or IEEE 1394a-2000 standard (hereinafter referred to as a high performance serial bus standard in conformity to the IEEE 1394) is explained. Further the same is true for other embodiments described later.

Figure 1:
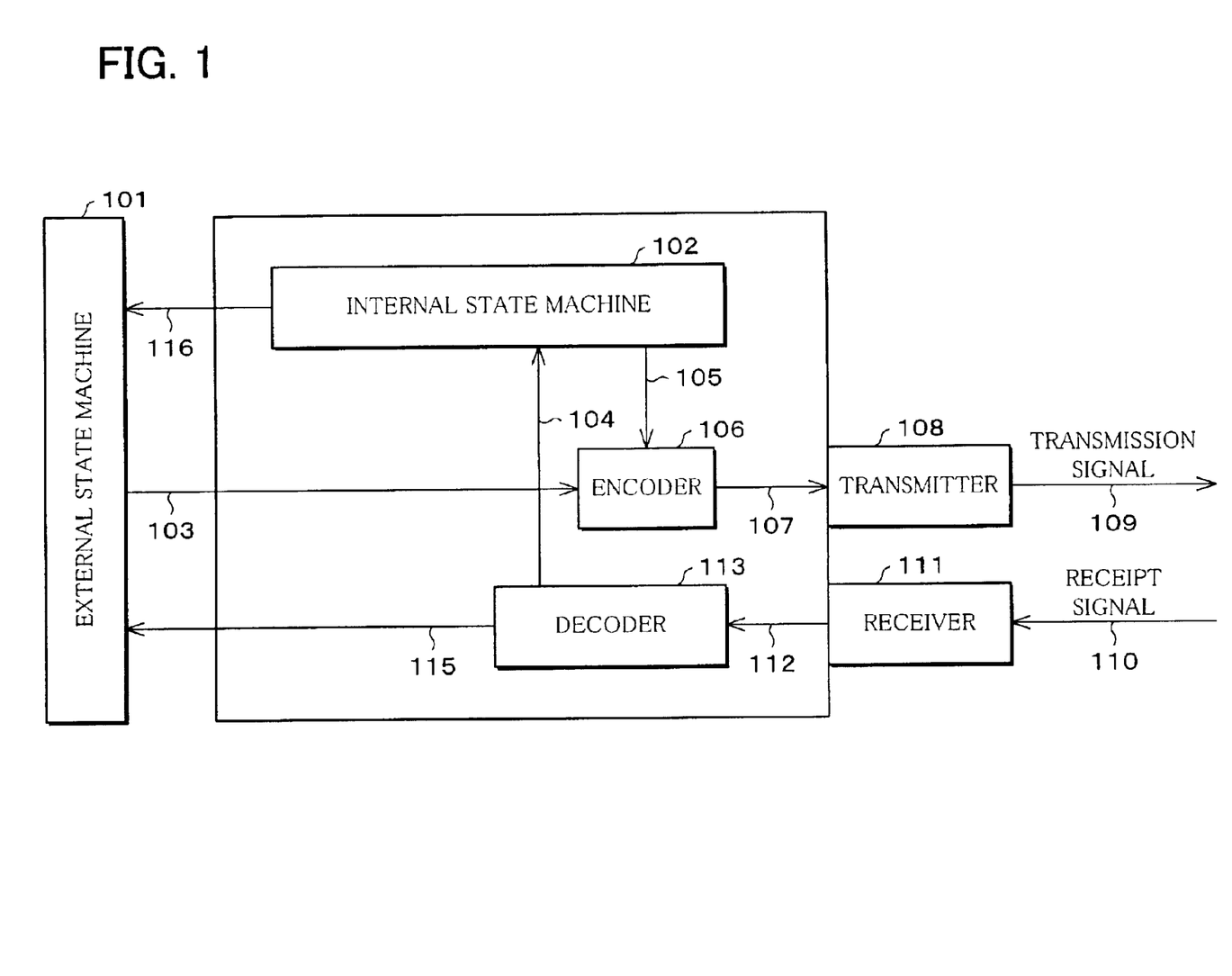
FIG. 1 is a schematic block diagram of an interface apparatus of an embodiment of the present invention.

The interface apparatus of the present embodiment includes an external state machine 101, an internal state machine 102, an encoder 106, a transmitter 108, a receiver 111, and a decoder 113, as shown in FIG. 1.

The external state machine 101 is a circuit for making a judgment as to communication states with the counterpart device, and composed of a PHY state machine of the IEEE 1394, for example. However, the external state machine 101 is not limited to the PHY state machine.

The internal state machine 102 judges whether the own device is in a data transmission preparatory state or in a data transmission state. When the own device is in the data transmission preparatory state, the internal state machine 102 carries out a preparatory operation for ensuring data transmission, such as speed negotiation, for example, thereby ensuring a high-quality channel.

In the interface apparatus of the arrangement, when the internal state machine 102 is in the data transmission preparatory state, the internal state machine 102 requests the encoder 106 via a signal line 105 to send a control code corresponding to a transmittable speed of the own device or a control code for confirming a termination of the speed negotiation, as well as receives from the decoder 113 via a signal line 104, whether a received signal is the control code corresponding to the transmittable speed of the counterpart device or the code for confirming the termination of the speed negotiation.

In the data transmission preparatory state, based on the transmission notification from the internal state machine 102, the encoder 106 generates a transmission code. The transmission code is converted into a transmission signal 109 by the transmitter 108. For the transmitter 108, an LED (a light emitting diode) or an LD (a laser diode) is used in optical communication, for example, but the present invention is not limited to this.

Furthermore, a receipt signal 110 is received by the receiver 111, and inputted to the decoder 113 via a signal line 112.

The decoder 113 decodes the receipt signal. When the decoder 113 receives a valid control code during the speed negotiation, such as the control code corresponding to the transmittable speed of the counterpart device or the code for confirming the termination of the speed negotiation, the decoder 113 notifies the internal state machine 102 of the receipt, and also decodes an arbitration signal of the IEEE 1394, which is then outputted to the external state machine 101 via a signal line 115.

During the data transmission preparatory state, the arbitration signal outputted by the decoder 113 is invalid. Therefore, the internal state machine 102 notifies the external state machine 101 via a signal line 116 that the own device is in the data transmission preparatory state. In this way, when the external state machine 101 receives an invalid arbitration signal from the decoder 113, the external state machine 101 ignores the signal as an invalid signal.

When the data transmission preparatory state ends with normal termination of the speed negotiation, the internal state machine 102 puts the own device in the data transmission state. This is then notified to the external state machine 101.

Receiving this notice, the external state machine 101 processes the arbitration signal or the data signal from the decoder 113 as a valid signal. Further, the external state machine 101 sends a control signal to the encoder 106 via the signal line 103 when there is an arbitration signal or a data signal to be sent.

Because the encoder 106 is in the data transmission state, the encoder 106 converts in accordance with a table, the signal into a predetermined code, and outputs the code to the transmitter 108. The transmitter 108 then sends the code to the counterpart device as a transmission signal 109.

With the above arrangement, the external state machine 101 invalidates the output signal from the decoder 113 in the data transmission preparatory state, whereas the external state machine 101 validates the output signal from the decoder 113 in the data transmission state, thereby realizing normal data transmission.

Here, (1) the receipt signals from the receiver 111 in the data transmission preparatory state and in the data transmission state in the interface apparatus of the above arrangement and (2) timing of the output to the external state machine 101, in the interface apparatus of the above arrangement are explained below, referring to a timing chart shown in FIG. 2.

Here, it is assumed that the speed negotiation with the counterpart device is carried out in the data transmission preparatory state. The data transmission preparatory state continues until 201. During the state, negotiation of the transfer rate with the counterpart device is carried out until 202, and the receipt signal from the receiver 111 indicates a transfer rate SP 1 (for example, a code for indicating the transfer rate of S100 in the IEEE 1394) of the counterpart device. Where a bit string of the SP1 is assigned to an RX_REQUEST signal in the arbitration signal of the IEEE 1394, the RX_REQUEST signal is outputted to the external state machine 101.

From timings 202 to 203, the receipt signal from the receiver 111 indicates a signal END_SPEED_NEGOTIATION for confirming the termination of the speed negotiation. Where a bit string of the END_SPEED_NEGOTIATION is assigned to RX_SUSPEND of the IEEE 1394, the RX_SUSPEND is outputted to the external state machine.

Further, the data transmission state starts after the timing 201, and a receipt signal BUS_RESET from the receiver 111 after the timing 203 is directly outputted to the external state machine 101.

Timing 204 when the output to the external state machine 101 transits from "RX_REQUEST" to "RX_SUSPEND" is delayed from timing 202 when the receipt signal from the receiver 111 transits from "SP1" to "END_SPEED_NEGOTIATION".

Further, timing 205 when the output to the external state machine 101 transits from "RX_SUSPEND" to "BUS_RESET" is delayed from timing 203 when the receipt signal from the receiver 111 transits from "END_SPEED_NEGOTIATION" to "BUS_RESET".

Therefore, the timing 205 when the output to the external state machine 101 transits is delayed from the timing 201 when the own device actually transits from the data transmission preparatory state to the data transmission state. This ensures transition of the own device from the data transmission preparatory state to the data transmission state.

Namely, the external state machine 101 invalidates the output of the interface in the data transmission preparatory state, and validates only the output after the transition to the data transmission state as a valid arbitration signal, thereby allowing the encoder 106 to normally transmit data.

Second Embodiment

Another embodiment of the present invention is explained as follows. Note that, also in the present embodiment, as the previous first embodiment, an interface apparatus used in the high performance serial bus standard in conformity to the IEEE 1394 is explained.

Figure 3:
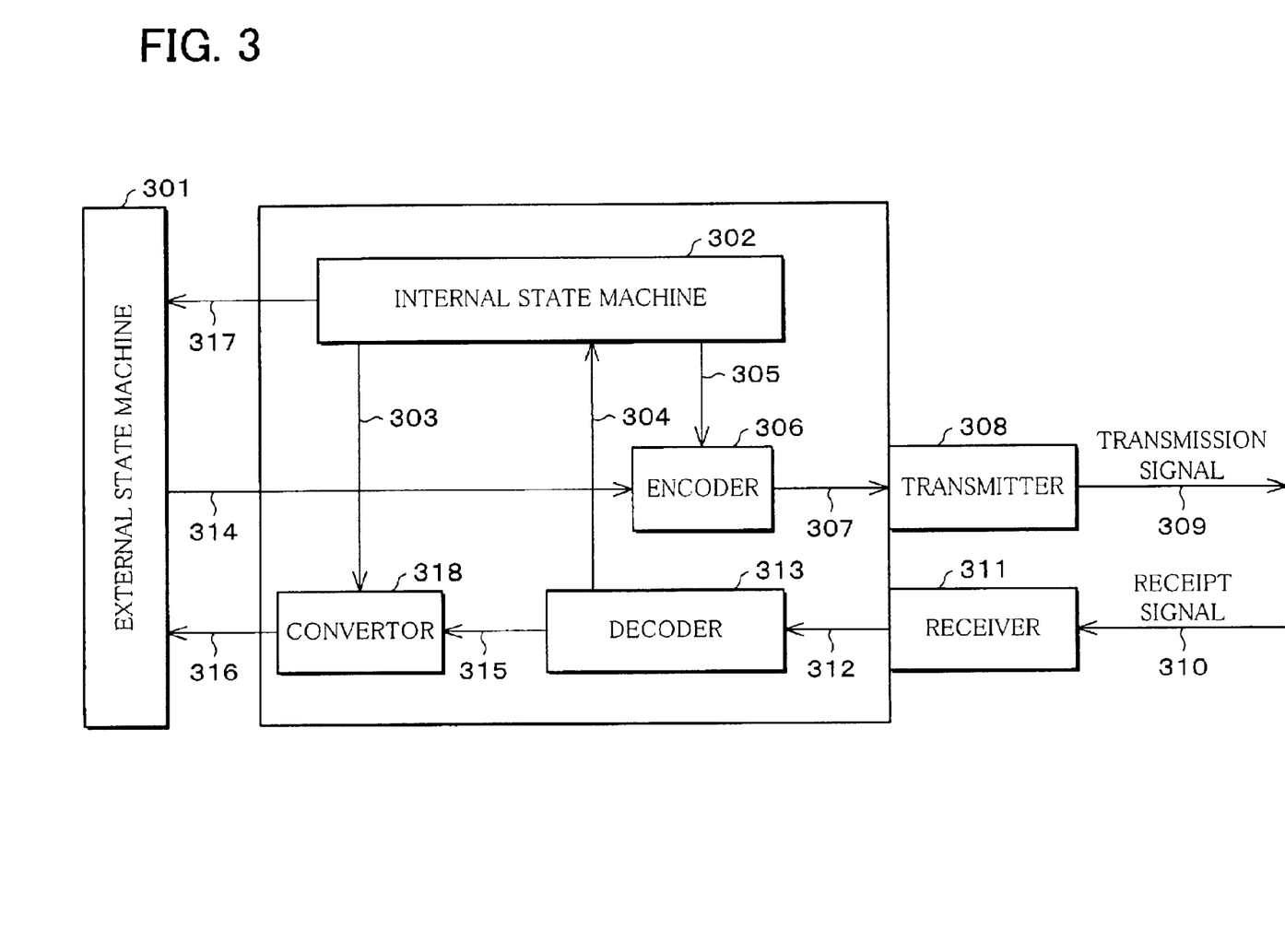
FIG. 3 is a schematic block diagram of an interface apparatus of another embodiment of the present invention.

The interface apparatus of the present embodiment is so arranged that in the interface apparatus shown in FIG. 1 of the previous first embodiment, a signal conversion circuit is provided between the external state machine 101 and the decoder 113; namely a convertor 318 is provided as a signal conversion circuit between an external state machine 301 and a decoder 313, as shown in FIG. 3.

Note that, in the interface apparatus shown in FIG. 3, constituent elements other than the convertor 318, namely an external state machine 301, an internal state machine 302, an encoder 306, a transmitter 308, a receiver 311, and a decoder 313, are functionally similar respectively to the external state machine 101, the internal state machine 102, the encoder 106, the transmitter 108, the receiver 111, and the decoder 113 in the interface apparatus of the previous first embodiment, and thus their explanation is omitted here.

Here, operation of the interface apparatus of the above arrangement is explained.

First, a receipt signal 310 is received by the receiver 311 and inputted to the decoder 313 via a signal line 312. The decoder 313 inputs the decoded signal into the internal state machine 302 via a signal line 304, and also into the convertor 318 via a signal line 315.

Next, the internal state machine 302 notifies the convertor 318 via a signal line 303, and also the external state machine 301 via a signal line 317, whether the own device is in the data transmission preparatory state or in the data transmission state.

In the data transmission preparatory state, when a specific arbitration signal (here, the specific arbitration signal is RX_SUSPEND, for example, but not limited to this) is inputted from the decoder 313 via the signal line 315, the convertor 318 converts the signal into another arbitration signal (here, the another arbitration signal is IDLE, for example, but not limited to this). On the other hand, when an arbitration signal other than the specific arbitration signal is inputted from the decoder 313, the convertor 318 directly outputs the signal to the external state machine 301 via a signal line 316.

Meanwhile, in the data transmission state, the arbitration signal inputted from the decoder 313 is directly outputted to the external state machine via the signal line 316.

As described above, the convertor 318 is inserted so that, in the data transmission preparatory state, the signal can be converted into another arbitration signal to be outputted to the external state machine 301 when the specific arbitration signal is outputted from the decoder 313.

Next, the internal state machine 302 notifies the external state machine 301 via a signal line 317 that the own device is in the data transmission state, and outputs data and a signal of a control code into the encoder 306 via the signal line 305.

The external state machine 301, when notified that the own device is in the data transmission state, directs the encoder 306 via the signal line 314 to encode the signal outputted from the internal state machine 302.

The signal encoded by the encoder 306 is outputted to the transmitter 308 via a signal line 307, and sent to the counterpart device as a transmission signal 309 from the transmitter 308.

Here, timing for transition from the data transmission preparatory state to the data transmission state in the interface apparatus of the above arrangement is explained as follows, referring to a timing chart shown in FIG. 4.

The timing chart shows (1) receipt signals from the receiver 311 in the data transmission preparatory state and in the data transmission state, (2) meanings of the receipt signals when decoded into the IEEE 1394 arbitration signals, and (3) output timing into the external state machine 301.

In this chart, it is assumed that speed negotiation is carried out with the counterpart device in the data transmission preparatory state. Further, like the timing chart of FIG. 2 in the previous first embodiment, the output signal to the external state machine 301 is invalidated in the data transmission preparatory state, whereas the output signal to the external state machine 301 is validated after transition to the data transmission state.

Figure 2:
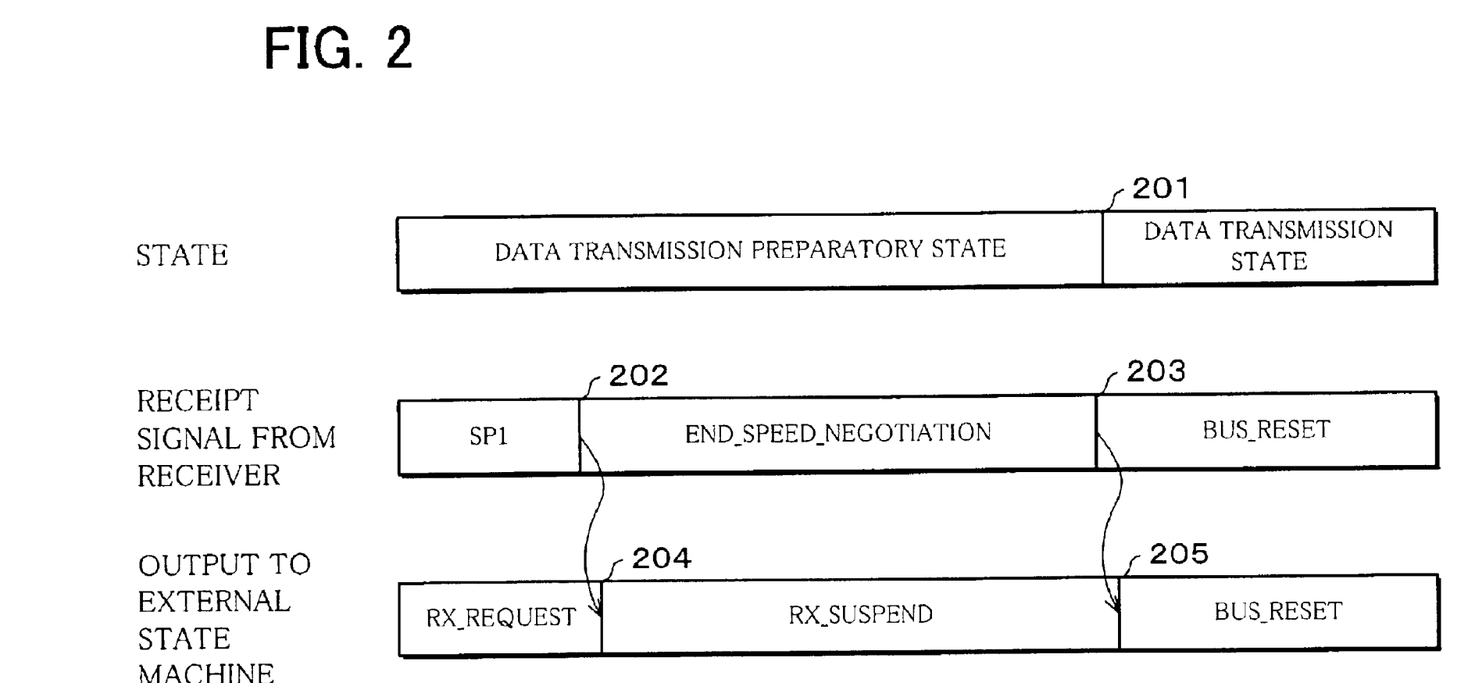
FIG. 2 is a timing chart of an output signal sent to an external state machine in a data transmission preparatory state and a data transmission state in the interface apparatus shown in FIG. 1.
Figure 4:
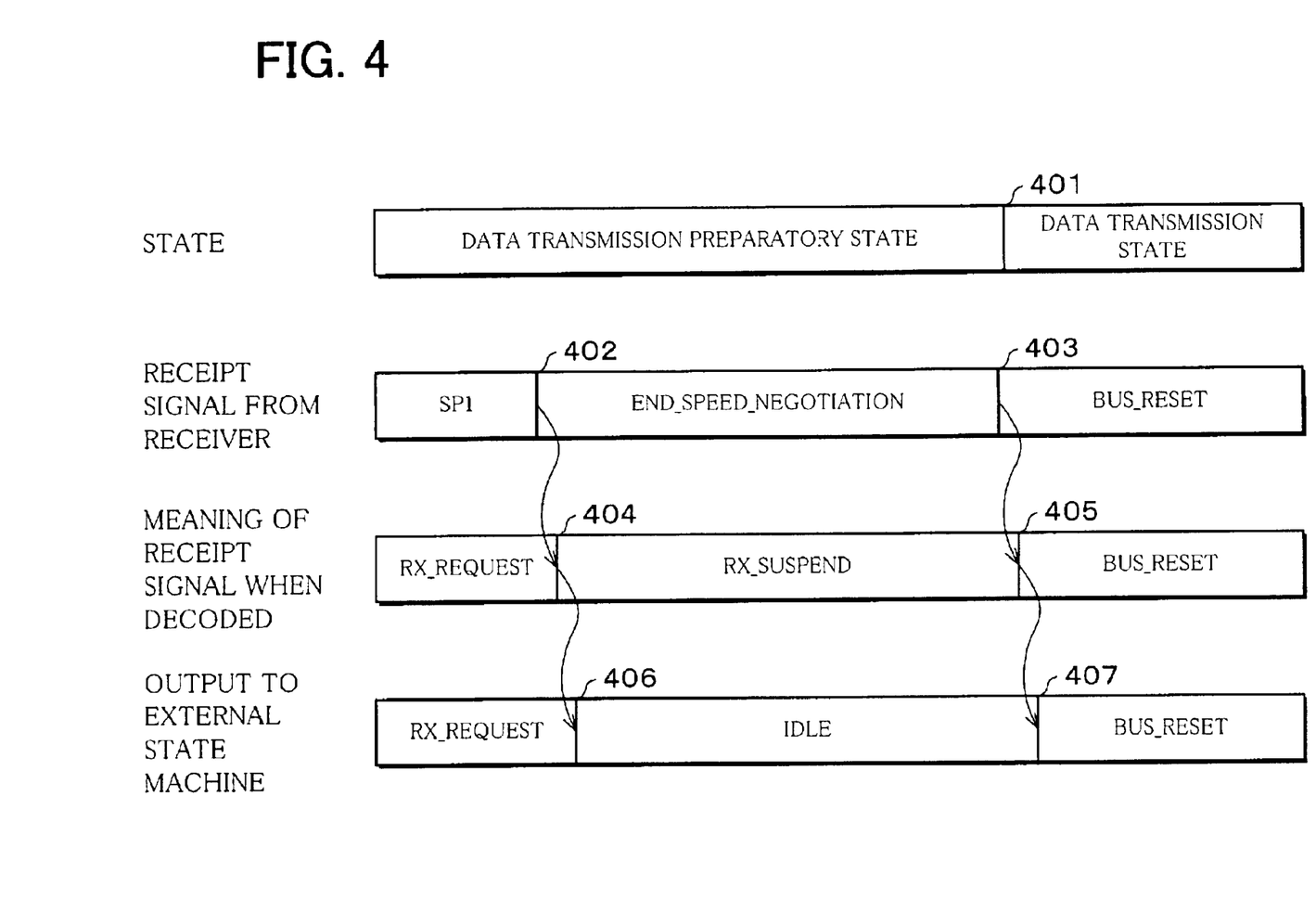
FIG. 4 is a timing chart of an output signal sent to the external state machine in the data transmission preparatory state and the data transmission state in the interface apparatus shown in FIG. 3.

In the timing chart shown in FIG. 4, as in the timing chart shown in FIG. 2, a receipt signal END_SPEED_NEGOTIATION from the receiver 311 in the data transmission preparatory state corresponds to RX_SUSPEND of the IEEE 1394.

Depending on timing 401 for transition from the data transmission preparatory state to the data transmission state, an arbitration signal RX_SUSPEND may be validated. The arbitration signal RX_SUSPEND is a signal for indicating that the own device and the counterpart device are connected but suspended because a data transmission request is not sent. When the arbitration signal RX_SUSPEND is validated, there is a possibility that the external state machine 301, which is composed of a PHY state machine, falls into a SUSPEND state depending on its mounting.

Therefore, in the interface apparatus of the present embodiment, the convertor 318 outputs IDLE instead of RX_SUSPEND into the external state machine 301 at timing 406. As described above, during the data transmission preparatory state, the specific arbitration signal is converted into another arbitration signal, that is the convertor 318 which converts the signal into IDLE instead of RX_SUSPEND in this case. This ensures the own device to transit from the data transmission preparatory state to the data transmission state with preventing the faulty operation.

In the timing chart shown in FIG. 4, timing 402 at which the receipt signal from the receiver 311 transits from "SP1" to "END_SPEED_NEGOTIATION" is not synchronous to timing 404 when the decoded receipt signals transit from "RX_REQUEST" to "RX_SUSPEND". In other words, the timing 404 is delayed from the timing 402.

Accordingly, timing 403 when the receipt signal from the receiver 311 transits from "END_SPEED_NEGOTIATION" to "BUS_RESET" is not synchronous to timing 405 when the decoded receipt signals transit from "RX_SUSPEND" to "BUS_RESET". In other words, the timing 405 is delayed from the timing 403.

Furthermore, the timing 405 when the decoded receipt signals transit from "RX_SUSPEND" to "BUS_RESET" is not synchronous to timing 407 when the output to the external state machine 301 transits from "IDLE" to "BUS_RESET". In other words, the timing 407 is delayed from the timing 405.

As described above, the transition timing 407 of the output to the external state machine 301 is delayed from timing 401 when the own device actually transits from the data transmission preparatory state to the data transmission state. This ensures the own device to transit from the data transmission preparatory state to the data transmission state.

Note that, as the external state machine 101 in the previous first embodiment, the above external state machine 301 may invalidate the inputted control code while the own device is in the data transmission preparatory state.

In this case, while the own device is in the data transmission preparatory state, even when a control code that may cause the device to faultily operate, such as a SUSPEND or a DISABLE, is inputted to the external state machine 301, the external state machine can invalidate the code, thereby surely preventing the device from faultily operating.

Third Embodiment

Still another embodiment of the present invention is explained below. Note that, also in the present embodiment, as in each of the embodiments, an interface apparatus used in a high performance serial bus standard in conformity to the IEEE 1394 is explained.

Figure 5:
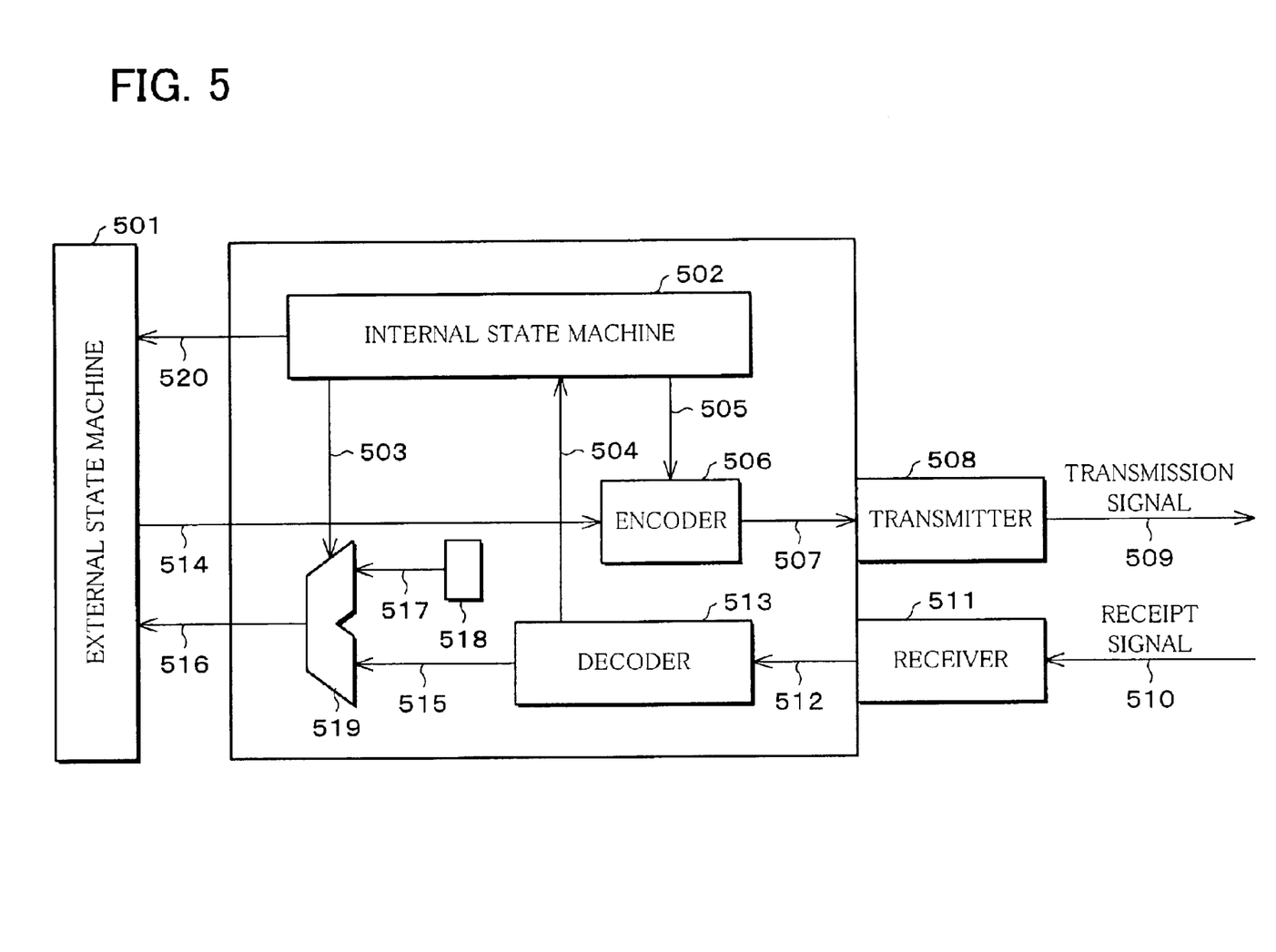
FIG. 5 is a schematic block diagram of an interface apparatus of still another embodiment of the present invention.

The interface apparatus of the present embodiment has such an arrangement that a signal selection circuit is provided between the external state machine 101 and the decoder 113 in the interface apparatus shown in FIG. 1 of the first embodiment; namely, a multiplexer 519 as the signal selection circuit and an arbitration signal generating module 518 for generating a specific arbitration signal are provided between an external state machine 501 and a decoder 513, as shown in FIG. 5.

Note that, in the interface apparatus shown in FIG. 5, constituent elements other than the multiplexer 519 and the arbitration signal generating module 518, namely the external state machine 501, an internal state machine 502, an encoder 506, a transmitter 508, a receiver 511, and the decoder 513 are functionally similar respectively to the external state machine 101, the internal state machine 102, the encoder 106, the transmitter 108, the receiver 111, and the decoder 113 in the interface apparatus of the first embodiment, and thus their detailed explanation is omitted here.

Here, operation of the interface apparatus of the above arrangement is explained.

First, a receipt signal 510 is received by the receiver 511 and inputted via a signal line 512 into the decoder 513. The decoder 513 inputs the decoded signal into the internal state machine 502 via a signal line 504, and also into the multiplexer 519 via a signal line 515.

Next, the internal state machine 502 notifies the multiplexer 519 via a signal line 503 and the external state machine 501 via a signal line 520 whether the own device is in the data transmission preparatory state or in the data transmission state.

On the other hand, the multiplexer 519 receives via a signal line 517, an arbitration signal, which is generated by the arbitration signal generating module 518 for generating a predetermined specific arbitration signal. Here, the generated arbitration signal is an IDLE signal, but not limited to this.

The multiplexer 519 outputs the specific arbitration signal into the external state machine 501 via a signal line 516 when the own device is in the data transmission preparatory state, whereas the multiplexer 519 outputs, into the external state machine 501, an arbitration signal sent from the decoder 513, when the own device is in the date transmission state.

As described above, in the interface apparatus of the arrangement, it is possible to output the specific arbitration signal (the IDLE signal) into the external state machine 501 in the data transmission preparatory state.

Furthermore, with the above arrangement, the circuit can be more simplified than the circuit in the arrangement of FIG. 3 in the second embodiment, which is the arrangement provided with the convertor 318. This can reduce electric power consumption in the data transmission preparatory state.

Next, the internal state machine 502 notifies the external state machine 501 via the signal line 520 that the own device is in the data transmission state, and outputs data and a signal of a control code into the encoder 506 via a signal line 505.

The external state machine 501, when notified that the own device is in the data transmission state, directs the encoder 506 via a signal line 514 to encode the signal outputted from the internal state machine 502.

The signal encoded by the encoder 506 is outputted to the transmitter 508 via a signal line 507, and then outputted to the counterpart device as a transmission signal 509.

Here, timing for transition from the data transmission preparatory state to the data transmission state in the interface apparatus of the arrangement is explained as follows, referring to a timing chart shown in FIG. 6.

The timing chart shows (1) receipt signals from the receiver 511 in the data transmission preparatory state and in the data transmission state, (2) meanings of the receipt signals when decoded into the arbitration signals of the IEEE 1394 standard, and (3) output timing to the external state machine 501.

In this chart, it is assumed that speed negotiation is carried out with the counterpart device in the data transmission preparatory state. Further, as in the timing chart of FIG. 2 in the first embodiment, an output signal into the external state machine 501 is invalidated in the data transmission preparatory state, and validated in the data transmission state.

Figure 6:
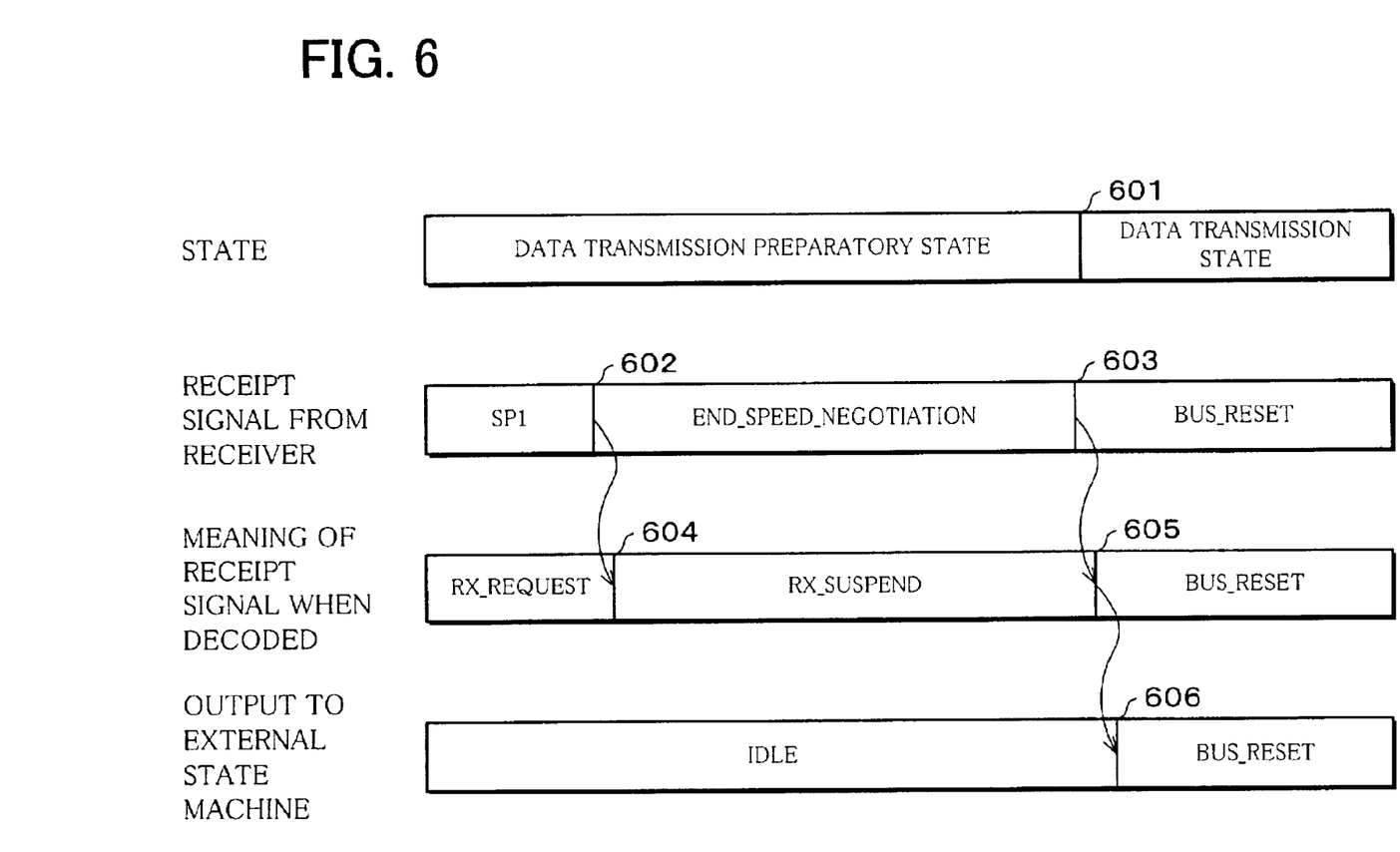
FIG. 6 is a timing chart of an output signal sent to the external state machine in the data transmission preparatory state and the data transmission state in the interface apparatus shown in FIG. 5.

In FIG. 6, in the data transmission preparatory state, no matter what arbitration signal the receipt signal from the receiver 511 is decoded into, a specific arbitration signal is outputted to the external state machine 501. Here, as the specific arbitration signal, IDLE is outputted.

In the timing chart shown in FIG. 6, in the data transmission preparatory state that continues until timing 601, the multiplexer 519 always outputs the specific arbitration signal (the IDLE signal) from the arbitration signal generating module 518 into the external state machine 501 regardless of the receipt signal from the receiver 511 (a signal from timing until 603).

In this case, the timing 602 when the receipt signal from the receiver 511 transits from "SP1" to "END_SPEED_NEGOTIATION" is not synchronous to timing 604 when the decoded receipt signals transit from "RX_REQUEST" to "RX_SUSPEND". In other words, the timing 604 is delayed from the timing 602.

Accordingly, the timing 603 when the receipt signal from the receiver 511 transits from "END_SPEED_NEGOTIATION" to "BUS_RESET" and timing 605 when the decoded receipt signals transit from "RX_SUSPEND" to "BUS_RESET" are not synchronous. In other words, the timing 605 is delayed from the timing 603.

Furthermore, the timing 605 when the decoded receipt signals transit from "RX_SUSPEND" to "BUS_RESET" and timing 606 when the output to the external state machine 501 transits from "IDLE" to "BUS_RESET" are not synchronous. In other words, the timing 606 is delayed from the timing 605.

As described above, the transition timing 606 of the output to the external state machine 501 is delayed from the timing 601 when the own device actually transits from the data transmission preparatory state to the data transmission state. This ensures the own device to transit from the data transmission preparatory state to the data transmission state.

Furthermore, in the data transmission preparatory state, transition from the data transmission preparatory state to the data transmission state is ensured by selecting an appropriate arbitration signal (for example, the IDLE signal) that does not affect the bus, as the specific arbitration signal.

Note that, like the external state machine 101 of the first embodiment, the external state machine 501 may invalidate the inputted control code while the own device is in the data transmission preparatory state.

In this case, while the own device is in the data transmission preparatory state, the external state machine 501 itself can invalidate the code, thereby surely preventing the device from faultily operating.

As described above, in each of the embodiments, the IEEE 1394 standard of the communication standard is described, but a communication method for the IEEE 1394 standard is not specifically limited to one method. Electronic communication whose channel is a metal cable, and optical communication whose channel is an optical fiber may be adapted as the communication method.

When the channel is the metal cable, connecting length between an own device and a counterpart device is limited up to 4.5 m, in consideration of transmission loss at a metal section.

On the other hand, when the channel is the optical fiber, the connecting length between an own device and a counterpart device are extended to 10 m at the maximum, since the transmission loss in the channel is smaller than that of the metal cable.

Furthermore, the present invention can be expressed as follows.

The interface apparatus of the present invention is a digital data interface apparatus having the data transmission preparatory state and the data transmission state, which outputs to the state machine the control code used in the data transmission state, where the control code is invalidated, during the data transmission preparatory state.

The interface apparatus of the present invention is a digital data interface apparatus having the data transmission preparatory state and the data transmission state, which does not output to the state machine a predetermined control code among the control codes used in the data transmission state during the data transmission preparatory state.

The interface apparatus of the present invention is a digital data interface apparatus having the data transmission preparatory state and the data transmission state, which keeps outputting a predetermined constant control code to the state machine during the data transmission preparatory state.

The interface apparatus of the present invention does not output a predetermined control code among control codes used in the data transmission state to the state machine during the data transmission preparatory state.

The interface apparatus of the present invention keeps outputting a predetermined constant control code to the state machine during the data transmission preparatory state.

Furthermore, the present invention may be realized with an interface apparatus can be described as follows.

A digital data interface apparatus of the present invention is so arranged that the interface apparatus includes an internal state machine for ensuring a high quality channel and output control means for controlling an output signal to an external state machine, wherein, in a data transmission preparatory state, the digital data interface apparatus outputs, to the external state machine, a control code that appears in a data transmission state no matter whether the digital data interface apparatus receives the control code or not.

According to the invention of the above arrangement, in the data transmission preparatory state, the external state machine is notified that the own device is in the data transmission preparatory state. Thereby, the external state machine can invalidate a valid control code even if the valid control code is outputted in the data transmission state.

A digital data interface apparatus of the present invention is so arranged that the interface apparatus includes an internal state machine for ensuring a high quality channel and output control means for controlling an output signal to an external state machine, wherein, in a data transmission preparatory state, the output control means outputs control codes that appear in a data transmission state other than specific codes such as a SUSPEND or a DISABLE.

According to the invention of the above arrangement, a control signal having a special effect on a bus in the data transmission state is not outputted to the external state machine also in the data transmission preparatory state, thereby allowing the own device to transit from the data transmission preparatory state to the data transmission state more surely.

A digital data interface apparatus of the present invention is so arranged that the interface apparatus includes an internal state machine for ensuring a high quality channel and output control means for controlling an output signal to an external state machine, wherein the output control means keeps outputting a predetermined constant control code to the external state machine in a data transmission preparatory state.

According to the invention of the above arrangement, in the data transmission preparatory state, the predetermined specific control code is outputted to the external state machine, thereby allowing the own device to transit from the data transmission preparatory state to the data transmission state more surely. Besides, it is expected to reduce electric power consumption in the data transmission preparatory state.

As described above, the present invention can prevent the system from faultily operating in the data transmission preparatory state.

Furthermore, in the above arrangement, any control code may be inputted while the own device is in the data transmission preparatory state, since the external state machine invalidates any control code inputted during the period.

For example, a control code in this case may be a control code used in the data transmission state, because the control code used in the data transmission state has such advantages that the use of this control code eliminates need for generating a control code inputted to the external state machine or adding a circuit for newly generating a control code.

Moreover, the interface apparatus may be so arranged that, while the own device is in the data transmission preparatory state, the external state machine does not receive a predetermined control code among control codes used in the data transmission state.

In this case, a predetermined control code may be specific control codes such as the SUSPEND or the DISABLE, for example, among control codes used in the data transmission state. If it is so arranged that these control codes are not inputted to the external state machine while the own device is in the data transmission preparatory state, it is possible to prevent the device from faultily operating even when the external state machine insufficiently invalidates the control code, thereby ensuring the own device to transit from the data transmission preparatory state to the data transmission state.

Moreover, the interface apparatus may be so arranged that, while the own device is in the data transmission preparatory state, the external state machine keeps receiving a predetermined same control code among control codes used in the data transmission state.

In this case, a predetermined specific control code may be control codes other than specific control codes such as the SUSPEND or the DISABLE, for example, among control codes used in the data transmission state. If it is so arranged that these control codes keep being inputted to the external state machine while the own device is in the data transmission preparatory state, it is possible to prevent the device from faultily operating even when the external state machine insufficiently invalidates the control code, thereby ensuring the own device to transit from the data transmission preparatory state to the data transmission state.

In order to solve the above problems, an interface apparatus of the present invention for sending and receiving data and a control code between an own device and a counterpart device may include an external state machine for controlling transmission of the data and the control code from the own device to the counterpart device in accordance with an inputted control code, a convertor for selectively outputting to the external state machine one of a control code (a) received from the counterpart device and a control code (b) generated by converting the control code (a) received from the counterpart device into a different type in case of necessity, and an internal state machine for judging whether the own device is in the data transmission preparatory state or in the data transmission state, and notifying a result of the judgment to the convertor, wherein the convertor converts the control code received from the counterpart device into a control code irrelevant to control of transmission of the data and the control code of the external state machine and outputs the converted control code to the external state machine during a period in which the internal state machine notifies the own device is in the data transmission preparatory state, whereas the convertor outputs to the external state machine the control code received from the counterpart device without converting during a period in which the internal state machine notifies the own device is in the data transmission state.

According to the arrangement, while the own device is in the data transmission state, the external state machine directly receives the data and the control code from the counterpart device so that the external state machine controls transmission of the data and the control code from the own device to the counterpart device in accordance with the inputted control code.

On the other hand, while the own device is in the data transmission preparatory state, the external state machine receives the control code from the counterpart device after the convertor converts the control code into a control code irrelevant to control of transmission of the data and the control code so that the external state machine does not control the transmission of the data and the control code from the own device to the counterpart device.

Because of this, in the data transmission state, the own device sends the data and the control code in accordance with the control code received from the counterpart device, whereas in the data transmission preparatory state, the own device does not control the transmission of the data and the control code no matter whether the counterpart device sends the data and the control code or not, thereby allowing the data and the control code to normally communicate between the own device and the counterpart device.

Therefore, it is possible to prevent the counterpart device from faultily operating when the own device sends the control code to the counterpart device during a period of the data transmission preparatory state (the data transmission preparatory period).

Furthermore, during the data transmission preparatory period, it is not necessary to generate the control code to be sent to the counterpart device, thereby reducing the electric power consumed for generating the control code. As a result, this can realize the interface apparatus that consumes a small amount of electric power.

Furthermore, the control code is converted into a receipt arbitration signal when received by the device, and converted into a transmission arbitration signal when sent by the device.

For example, when a communication standard between an own device and a counterpart device is the IEEE 1394, a state machine (PHY) in conformity to the IEEE 1394 is used as the external state machine. The PHY uses signals of kinds shown in FIG. 8, for example, as the transmission arbitration signals and uses signals of kinds shown in FIG. 9, as the receipt arbitration signals, for example.

Here, an receipt arbitration signal which is converted from the control code irrelevant to the control of transmission of the data and the control code may be a signal whose line state is named "IDLE" shown in FIG. 9, for example. This IDLE indicates that a connected adjacent device (node), which is the external state machine (PHY), is not operative.

Therefore, while the own device is in the data transmission preparatory state, the control code inputted to the external state machine is converted to the control code for indicating the IDLE, so that the external state machine does not control the transmission of the data and the control code.

In order to solve the problems, an interface apparatus of the present invention for sending and receiving data and a control code between the own device and the counterpart device may include an external state machine for controlling transmission of the data and the control code from the own device to the counterpart device in accordance with an inputted control code, a control code generating circuit for generating a control code irrelevant to control of transmission of the data and the control code by the external state machine, a switching circuit for switching and outputting the control code generated by the control code generating circuit and the control code received from the counterpart device, and an internal state machine for judging whether the own device is in the data transmission preparatory state or in the data transmission state, and notifying a result of the judgment to the convertor, wherein the switching circuit outputs to the external state machine the control code generated by the control code generating circuit during a period in which the internal state machine notifies the own device is in the data transmission preparatory state, whereas the switching circuit outputs to the external state machine the control code received from the counterpart device during a period in which the internal state machine notifies that the own device is in the data transmission state.

According to the arrangement, while the own device is in the data transmission state, the external state machine directly receives the data and the control code from the counterpart device so that the external state machine controls transmission of the data and the control code from the own device to the counterpart device in accordance with the inputted control code.

On the other hand, while the own device is in the data transmission preparatory state, the external state machine receives the control code generated by the control code generating circuit, namely the control code irrelevant to the control of transmission of the data and the control code, so that the external state machine does not control the transmission of the data and the control code from the own device to the counterpart device.

Because of this, in the data transmission state, the own device sends the data and the control code in accordance with the control code received from the counterpart device, whereas in the data transmission preparatory state, the own device does not send the data and the control code no matter whether the counterpart device sends the data and the control code or not, thereby allowing the data and the control code to normally communicate between the own device and the counterpart device.

Therefore, it is possible to prevent the counterpart device from faultily operating when the own device sends the control code to the counterpart device during a period of the data transmission preparatory state (the data transmission preparatory period).

Furthermore, during the data transmission preparatory period, the control code for being sent to the counterpart device is not required to be generated, thereby reducing the electric power consumed for generating the control code. As a result, this can realize the interface apparatus that consumes a small amount of electric power.

Furthermore, the control code is converted into a receipt arbitration signal when received by the device, and converted into a transmission arbitration signal when sent by the device.

For example, when a communication standard between an own device and a counterpart device is the IEEE 1394, a state machine (PHY) in conformity to the IEEE 1394 is used as the external state machine. The PHY uses signals of kinds shown in FIG. 8, for example, as the transmission arbitration signals and uses signals of kinds shown in FIG. 9, as the receipt arbitration signals, for example.

Here, the control code generated by the control code generating circuit, namely an receipt arbitration signal which is converted from the control code irrelevant to the control of transmission of the data and the control code, may be a signal whose line state is named "IDLE" shown in FIG. 9, for example. This IDLE indicates that a connected adjacent device (node), which is the external state machine (PHY), is not operative.

Therefore, while the own device is in the data transmission preparatory state, the control code for indicating the IDLE is always outputted to the external state machine, thereby ensuring the external state machine not to control the transmission of the data and the control code.

Moreover, the interface apparatus may be so arranged that a communication standard between an own device and a counterpart device is in conformity to IEEE 1394-1995 or IEEE 1394a-2000.

Moreover, the interface apparatus may be so arranged that the own device and the counterpart device communicate with each other with optical communication.

In this case, since an optical fiber is used for a channel, a connecting distance between an own device and a counterpart device, namely a channel, can be longer compared with the case when a metal cable is used.

Specifically, in a case of a communication standard of the IEEE 1394, a channel length of the metal cable is up to 4.5 m, whereas a channel length of the optical fiber is about 10 m.

Each interface apparatus of the arrangement is preferably used for a communication device used for communication between a personal computer and its peripheral device, and between Audio/Visual devices.

In order to solve the problems, a communication device of the present invention for sending and receiving data and a control code between the own device and the counterpart device may include a receiver for receiving the data and the control code, a transmitter for sending the data and the control code, and an interface apparatus for incorporating into the own device the data and the control code received by the receiver, and outputting to the transmitter the data and the control code generated in the own device, wherein the interface apparatus is the interface apparatus of each arrangement as described above.

According to the arrangement, while the own device is in the data transmission preparatory state, the own device is suspended to send the data and the control code to the counterpart device, thereby preventing the own device and the counterpart device from faultily operating. Further this eliminates useless transmission of a signal, thereby reducing electric power for generating and sending the signal.

In order to solve the problems, an interface apparatus of the present invention for sending and receiving data and a control code between the own device and the counterpart device may include an external state machine for controlling transmission of the data and the control code from the own device to the counterpart device in accordance with an inputted control code and an internal state machine for judging whether the own device is in the data transmission preparatory state or in the data transmission state, and notifies a result of the judgment to the external state machine.

According to the arrangement, while the own device is in the data transmission preparatory state, the data and the control code inputted from the counterpart device to the own device are invalidated, thereby suspending the transmission of the data and the control code from the own device to the counterpart device while the own device is in the data transmission preparatory state. As a result, this can prevent the own device and the counterpart device from faultily operating. Further a useless signal is not sent, thereby reducing the electric power for generating and sending the signal.

In order to solve the problems, an interface apparatus of the present invention for sending and receiving data and a control code between the own device and the counterpart device may include an external state machine for controlling transmission of the data and the control code from the own device to the counterpart device in accordance with an inputted control code and an internal state machine for judging whether the own device is in the data transmission preparatory state or in the data transmission state, and notifies a result of the judgement to the external state machine.

According to the arrangement, since it is possible to judge whether the own device is in the data transmission preparatory state or not, it is possible to determine whether or not the own device controls the transmission of the data and the control code from the own device to the counterpart device.

Because of this, the own device sends the data and the control code in accordance with the inputted control code (generally the control code received from the counterpart device) in the data transmission state, whereas the own device does not send the data and the control code no matter whether the own device receives the data and the control code from the counterpart device, thereby allowing the own device and the counterpart device to normally communicate the data and the control code.

Therefore, it is possible to prevent the counterpart device from faultily operating when the control code is sent from the own device to the counterpart device in a period of the data transmission preparatory state (the data transmission preparatory period). Further it is not necessary to generate the control code for being sent to the counterpart device, thereby reducing the electric power for generating the control code. As a result, this can realize the interface apparatus that consumes a small amount of electric power.

In order to solve the problems, an interface apparatus of the present invention for sending and receiving data and a control code between the own device and the counterpart device may include an external state machine for controlling transmission of the data and the control code from the own device to the counterpart device in accordance with an inputted control code, an internal state machine for judging whether the own device is in a data transmission preparatory state or in a data transmission state, and notifies a result of the judgment to the external state machine, and a decoder for decoding a receipt signal, wherein the external state machine invalidates an output signal from the decoder in the data transmission preparatory state and the external state machine validates the output signal from the decoder in the data transmission state.

According to the arrangement, the data can be normally transmitted.

In other words, when the data transmission preparatory state is terminated with normal termination of the speed negotiation, the internal state machine puts the own device in the data transmission state, then notifies the external state machine that the own device in the data transmission state. The external state machine processes the arbitration signal or the data signal from the decoder as a valid signal, and outputs a control signal to the encoder via the signal line when there is an arbitration signal or a data signal to be sent. Since the encoder is in the data transmission state, the encoder converts the control code into a predetermined code in accordance with a table and outputs the code to the transmitter, from which the code is sent to the counterpart device as the transmission signal.

Because of this, the external state machine invalidates the output signal from the decoder in the data transmission preparatory state, whereas the external state machine validates the output signal from the decoder, thereby allowing the data to be normally transmitted.

In order to solve the problems, an interface apparatus of the present invention for sending and receiving data and a control code between the own device and the counterpart device may include an external state machine for controlling transmission of the data and the control code from the own device to the counterpart device in accordance with an inputted control code, an internal state machine for judging whether the own device is in the data transmission preparatory state or in the data transmission state, and notifies a result of the judgment to the external state machine, wherein timing when output to the external state machine transits is delayed from timing when the own device actually transits from the data transmission preparatory state to the data transmission state.

According to the arrangement, the timing when the output to the external state machine transits is delayed from timing when the own device actually transits from the data transmission preparatory state to the data transmission state, thereby ensuring the own device to transit from the data transmission preparatory state to the data transmission state.

In other words, the external state machine invalidates the output of the interface in the data transmission preparatory state, and only validates the output after transited to the data transmission state, thereby ensuring the encoder to normally transmit the data.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An interface apparatus for sending and receiving data and a control code between an own device, including an internal state machine and an external state machine, and a counterpart device, comprising:

an external state machine for controlling transmission of the data and the control code from the own device to the counterpart device in accordance with an inputted control code; and an internal state machine for judging whether the own device is in a data transmission preparatory state or in a data transmission state and notifies a result of the judgment to the external state machine, wherein the external state machine invalidates the inputted control code during a period in which the internal state machine notifies that the own device is in the data transmission preparatory state.

2. The interface apparatus as set forth in claim 1, wherein:
   a control code inputted in the external state machine while the own device is in the data transmission preparatory state is a control code used in the data transmission state.

3. The interface apparatus as set forth in claim 2, wherein:
   while the own device is in the data transmission preparatory state, the external state machine does not receive a predetermined control code among control codes used in the data transmission state.

4. The interface apparatus as set forth in claim 2, wherein:
   while the own device is in the data transmission preparatory state, the external state machine keeps receiving a predetermined same control code among control codes used in the data transmission state.

5. The interface apparatus as set forth in claim 1, wherein:
   a communication standard between an own device and a counterpart device is in conformity to IEEE 1394-1995 or IEEE 1394a-2000.

6. The interface apparatus as set forth in claim 1, wherein:
   the own device and the counterpart device communicate with each other with optical communication.

7. A communication device for sending and receiving data and a control code between an own device and a counterpart device, comprising:

a receiver for receiving the data and the control code;

a transmitter for sending the data and the control code; and an interface apparatus for incorporating into the own device the data and the control code received by the receiver, and outputting to the transmitter the data and the control code generated in the own device, wherein the interface apparatus is the interface apparatus as set forth in claim 1.

8. An interface apparatus for sending and receiving data and a control code between an own device, including an internal state machine and an external state machine, and a counterpart device, comprising:

an external state machine for controlling transmission of the data and the control code from the own device to the counterpart device in accordance with an inputted control code;

a convertor for selectively outputting to the external state machine one of a control code (a) received from the counterpart device and a control code (b) generated by converting the control code (a) received from the counterpart device into a different type in case of necessity; and an internal state machine for judging whether the own device is in the data transmission preparatory state or in the data transmission state, and notifying a result of the judgment to the convertor, wherein the convertor converts the control code received from the counterpart device into a control code irrelevant to control of transmission of the data and the control code of the external state machine and outputs the converted control code to the external state machine during a period in which the internal state machine notifies the own device is in the data transmission preparatory state, whereas the convertor outputs to the external state machine the control code received from the counterpart device without converting during a period in which the internal state machine notifies the own device is in the data transmission state.

9. A communication device for sending and receiving data and a control code between an own device and a counterpart device, comprising:

a receiver for receiving the data and the control code;

a transmitter for sending the data and the control code; and an interface apparatus for incorporating into the own device the data and the control code received by the receiver, and outputting to the transmitter the data and the control code generated in the own device, wherein the interface apparatus is the interface apparatus as set forth in claim 8.

10. An interface apparatus for sending and receiving data and a control code between an own device, including an internal state machine and an external state machine, and a counterpart device, comprising:

an external state machine for controlling transmission of the data and the control code from the own device to the counterpart device in accordance with an inputted control code;

a control code generating circuit for generating a control code irrelevant to control of transmission of the data and the control code by the external state machine;

a switching circuit for switching and outputting the control code generated by the control code generating circuit and the control code received from the counterpart device; and an internal state machine for judging whether the own device is in the data transmission preparatory state or in the data transmission state, and notifying a result of the judgment to a convertor, wherein the switching circuit outputs to the external state machine the control code generated by the control code generating circuit during a period in which the internal state machine notifies the own device is in the data transmission preparatory state, whereas the switching circuit outputs to the external state machine the control code received from the counterpart device during a period in which the internal state machine notifies that the own device is in the data transmission state.

11. A communication device for sending and receiving data and a control code between an own device and a counterpart device, comprising:

a receiver for receiving the data and the control code;

a transmitter for sending the data and the control code; and an interface apparatus for incorporating into the own device the data and the control code received by the receiver, and outputting to the transmitter the data and the control code generated in the own device, wherein the interface apparatus is the interface apparatus as set forth in claim 10.

12. A communication method for sending and receiving data and a control code between an own device and a counterpart device, said method comprising determining that the own device is in a data transmission preparatory state; and invalidating by the own device data a control code inputted from the counterpart device.

13. An interface apparatus for sending and receiving data and a control code between the own device and the counterpart device, comprising:

an external state machine for controlling transmission of the data and the control code from the own device to the counterpart device in accordance with an inputted control code; and an internal state machine for judging whether the own device is in the data transmission preparatory state or in the data transmission state, and notifies a result of the judgment to the external state machine.

14. An interface apparatus for sending and receiving data and a control code between the own device and the counterpart device, comprising:

an external state machine for controlling transmission of the data and the control code from the own device to the counterpart device in accordance with an inputted control code;

an internal state machine for judging whether the own device is in a data transmission preparatory state or in a data transmission state, and notifies a result of the judgment to the external state machine; and a decoder for decoding a receipt signal, wherein the external state machine invalidates an output signal from the decoder in the data transmission preparatory state and the external state machine validates the output signal from the decoder in the data transmission state.

15. An interface apparatus for sending and receiving data and a control code between the own device and the counterpart device, comprising:

an external state machine for controlling transmission of the data and the control code from the own device to the counterpart device in accordance with an inputted control code;

an internal state machine for judging whether the own device is in the data transmission preparatory state or in the data transmission state, and notifies a result of the judgment to the external state machine, wherein timing when output to the external state machine transits is delayed from timing when the own device actually transits from the data transmission preparatory state to the data transmission state.

* * * * *